United States Patent [19]
Fukai

[11] Patent Number: 4,896,222
[45] Date of Patent: Jan. 23, 1990

[54] METHOD OF AND APPARATUS FOR CORRECTING IMAGE SIGNAL

[75] Inventor: Nobutaka Fukai, Kanagawa, Japan

[73] Assignee: Fuji Photo Film Co., Ltd., Kanagawa, Japan

[21] Appl. No.: 241,180

[22] Filed: Sep. 7, 1988

[30] Foreign Application Priority Data

Sep. 7, 1987 [JP] Japan .................................. 62-224846

[51] Int. Cl.$^4$ .......................... H04N 1/00; H04N 1/40
[52] U.S. Cl. .................................. 358/446; 358/443; 358/447
[58] Field of Search ............... 358/280, 282, 284, 163, 358/166, 285, 264, 443, 445, 446, 447; 250/563

[56] References Cited

U.S. PATENT DOCUMENTS

| | | | |
|---|---|---|---|
| 4,054,377 | 10/1977 | Gibson | 250/563 |
| 4,150,402 | 4/1979 | Tietz | 358/285 |
| 4,548,463 | 10/1985 | Cato | 350/3.71 |
| 4,620,200 | 10/1986 | Fukai | 358/296 |
| 4,691,241 | 9/1987 | Tomohisa | 358/264 |
| 4,734,783 | 3/1988 | Horikawa | 358/280 |

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

An object such as a stimulable phosphor sheet on which image information is recorded is scanned by a light beam such as a laser beam, and light bearing the image information from the object is photoelectrically detected to produce an image signal representing the image information. A monitor signal representing the light beam is divided into a high-frequency component and a low-frequency component. A corrective signal is produced multiplying a ratio of the high-frequency component to the low-frequency component by a constant. The corrective signal is then subtracted from the image signal.

6 Claims, 3 Drawing Sheets

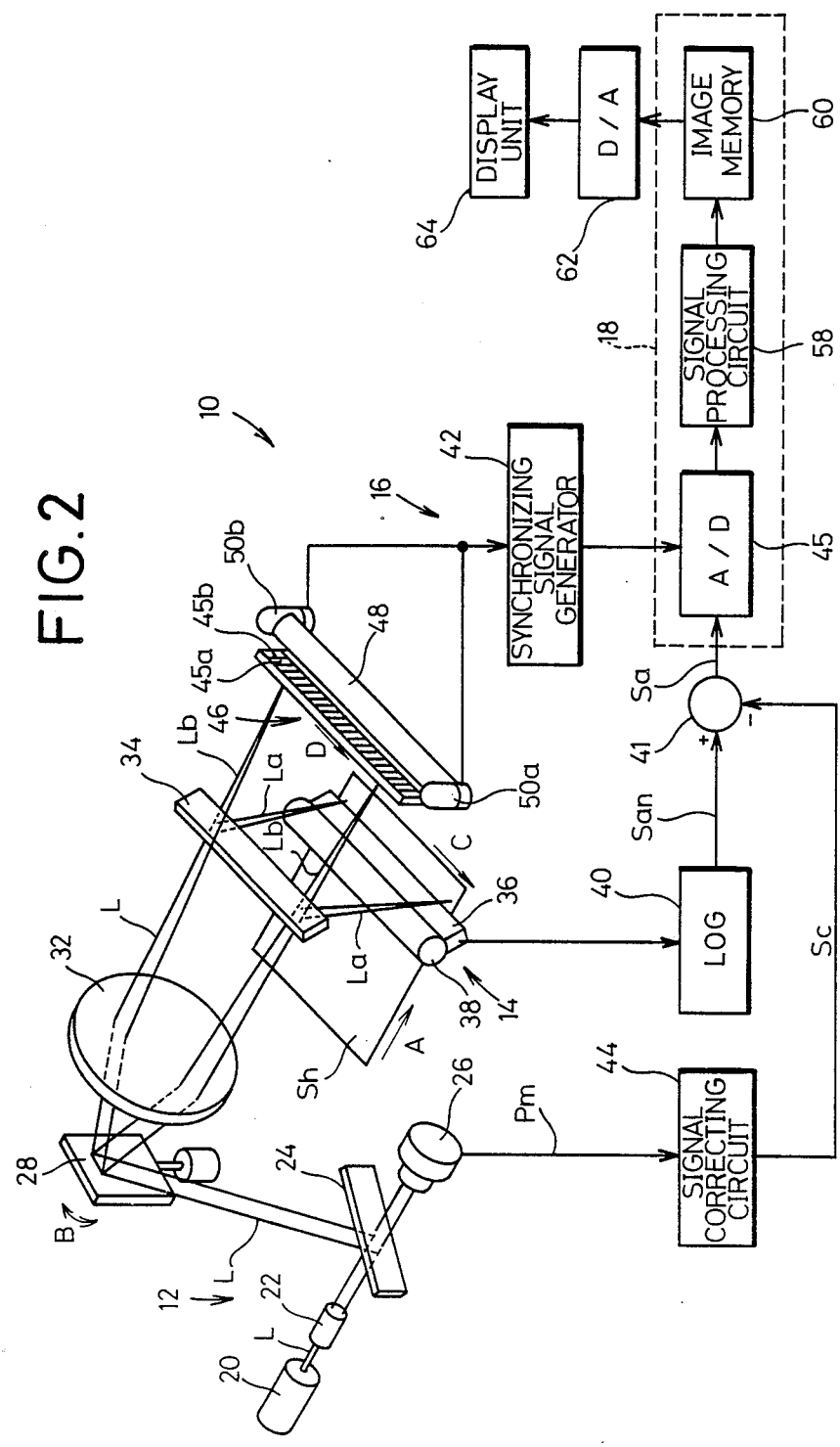

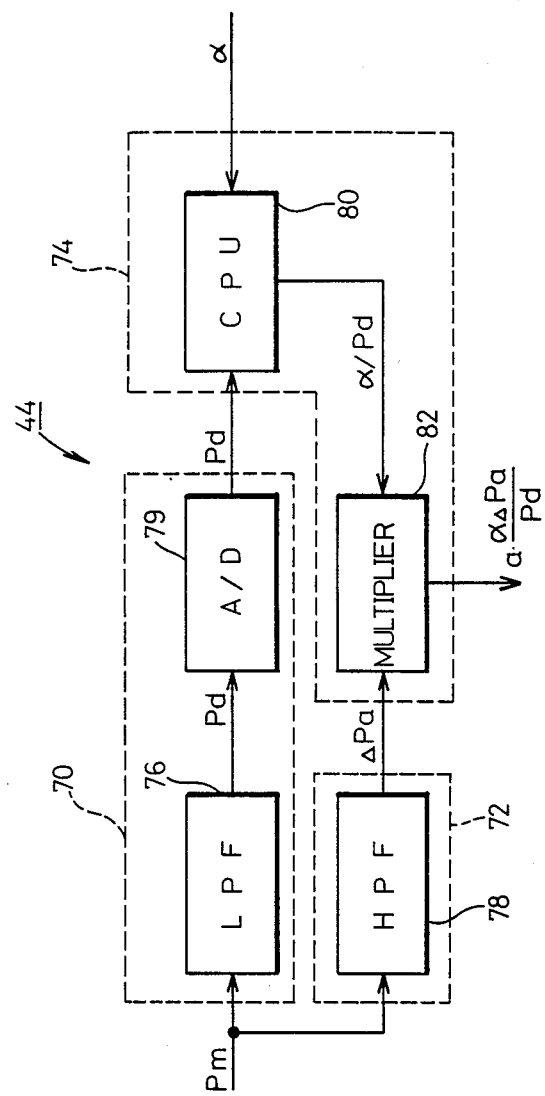

METHOD OF AND APPARATUS FOR CORRECTING IMAGE SIGNAL

BACKGROUND OF THE INVENTION

The present invention relates to the reading of an image from an object by scanning the object, and more particularly to a method of and an apparatus for correcting an image signal, while reading an image based on the image signal which is produced by scanning an object on which image information is recorded, with a light beam, and photoelectrically detecting light bearing the image information, by substantially subtracting a noise component contained in the light beam from the image signal to remove an image noise component from the image signal, which would otherwise be generated by the noise component in the light beam.

Heretofore, there have widely been employed a light beam scanning reading apparatus for scanning an object on which image information is recorded, with a light beam which is deflected in a main scanning direction by a light deflector such as a galvanometer mirror, a rotating polygon, a hologram scanner, or the like, simultaneously moving the object relatively in an auxiliary scanning direction which is substantially normal to the main scanning direction, for thereby scanning the object two-dimensionally, and photoelectrically detecting light bearing the recorded image information, which is emitted from the object, to read the image information as an electric signal. One example of such a light beam scanning reading apparatus is a radiation image information reading apparatus in which a stimulable phosphor sheet with radiation image information recorded thereon is scanned by stimulating light such as a laser beam or the like to emit light bearing the recorded radiation image information, and the emitted light is photoelectrically detected to produce an image signal.

The stimulating light in the radiation image information reading apparatus is generated by a light source such as a gas laser or a semiconductor laser, for example. As shown in FIG. 1 of the accompanying drawings, the laser produces laser noise $\Delta P$ in the vicinity of a given laser output level Po. The laser noise $\Delta P$ causes a level So, corresponding to the laser output level Po, of light PSL emitted from the stimulable phosphor sheet to vary by $\Delta S$. Therefore, the generated image signal contains image noise corresponding to the variation $\Delta S$ in the emitted light PSL. As a result, an image reproduced from the image signal becomes inaccurate.

SUMMARY OF THE INVENTION

In view of the aforesaid drawbacks of the prior art, it is an object of the present invention to provide a method of and an apparatus for correcting an image signal, which is produced by scanning an object on which image information is recorded, with a laser beam, and photoelectrically detecting light bearing the image information, by subtracting a corrective signal generated according to an output signal from a power monitor for the laser beam from a signal that is produced by logarithmic conversion of the image signal, for thereby eliminating image noise which would otherwise be caused by laser noise contained in the laser beam, and hence producing an accurate image signal.

Another object of the present invention is to provide a method of correcting an image signal, comprising the steps of: scanning an object on which image information is recorded, with a light beam; photoelectrically detecting light bearing the image information from the object to produce an image signal representing the image information; dividing a monitor signal representing the light beam into a high-frequency component and a low-frequency component; producing a corrective signal by multiplying a ratio of the high-frequency component to the low-frequency component by a constant; and processing the image signal with the corrective signal.

Still another object of the present invention is to provide a method of correcting an image signal, wherein the image signal is processed by substantially subtracting the corrective signal from the image signal.

Yet another object of the present invention is to provide an apparatus for correcting an image signal, comprising: a light beam source for emitting a light beam; scanner means for scanning an object on which image information is recorded, with the light beam; photoelectric converter means for photoelectrically detecting light bearing the image information from the object to produce an image signal representing the image information; means for reading the image information based on the image signal; monitor means for monitoring the intensity of the light beam emitted from the light beam source; signal correcting means for dividing an output signal from the monitor means into a high-frequency component and a low-frequency component and for producing a corrective signal by multiplying a ratio of the high-frequency component to the low-frequency component by a constant; and processing means for processing the image signal produced by the photoelectric converter means with the corrective signal produced by the signal correcting means.

Yet still another object of the present invention is to provide an apparatus for correcting an image signal, wherein the processing means comprises subtracting means for substantially subtracting the corrective signal from the image signal.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a schematic perspective view, partly in block form, of an image scanning reading apparatus incorporating a signal correcting circuit for carrying out a method of the present invention; and FIG. 3 is a block diagram of the signal correcting circuit in the image scanning reading apparatus.

DETAILED DESCRIPTION OF THE PREFERRED EMBODIMENT

Figure 1:
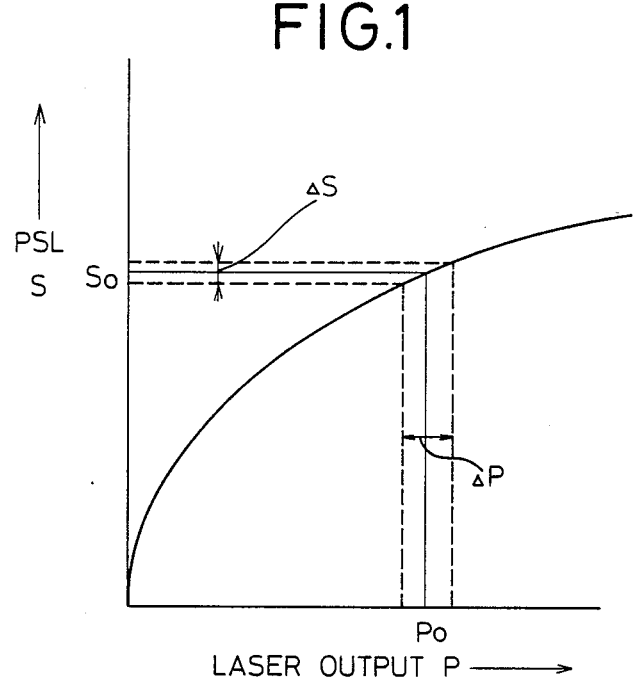
FIG. 1 is a graph showing the relationship between laser output and light emitted from a stimulable phosphor sheet upon application of a laser beam thereto.

FIG. 2 schematically shows an image scanning reading apparatus 10 in which a signal correcting circuit for carrying out an image signal correcting method of the present invention is incorporated. The image scanning reading apparatus 10 basically comprises a laser scanner 12 for scanning a stimulable phosphor sheet Sh which is fed in an auxiliary scanning direction (indicated by the arrow A) with a laser beam La, an image reader 14 for photoelectrically converting light bearing image information obtained by scanning the stimulable phosphor sheet Sh with the laser beam La, a synchronizing signal generating assembly 16 for producing a synchronizing signal from the laser beam Lb, and a signal processor 18 for digitizing an output image from the image reader 14 each time a synchronizing signal is produced by the synchronizing signal generating assembly 16 and for storing the digitized image in an image memory. When a certain phosphor is exposed to a radiation such as X rays, α-rays, β-rays, γ-rays, cathode rays, or ultraviolet rays, for example, the phosphor stores a part of the energy of the radiation. When the phosphor exposed to the radiation is subsequently exposed to stimulating rays such as visible light, the phosphor emits light in proportion to the stored energy. The phosphor exhibiting such a property is referred to as a "stimulable phosphor", and the stimulable phosphor sheet is a sheet having a layer of such stimulable phosphor.

A laser beam L emitted from a laser beam source 20 of the laser scanner 12 is passed through a beam expander 22 which produces a laser beam of a desired diameter. Then, the laser beam L is applied through a first half-silvered mirror 24 to a power monitor 26 comprising a photodiode or the like. The laser beam L is also reflected by the first half silvered mirror 24 toward a galvanometer mirror 28 which is angularly moved back and forth in the directions of the arrow B to reflect and deflect the laser beam L in a main scanning direction. Rather than the galvanometer mirror 28, any of various other light deflectors such as a rotating polygon, a hologram scanner, an AOM (acousto optic modulator). or the like may be employed for deflecting the laser beam L.

The laser beam L which is reflected and deflected by the galvanometer mirror 28 that is angularly moved back and forth is passed through a scanning lens 32 such as an fθ lens or the like positioned in the light path of the laser beam L, and then applied to a half-silvered mirror 34 disposed across light path and extending in the main scanning direction. Of the entire laser beam L applied to the mirror 34, an amount of laser beam which is required for scanning the stimulable phosphor sheet Sh is reflected as a scanning laser beam La by the mirror 34, while the remaining amount of laser beam is passed as a synchronizing laser beam Lb through the mirror 34. The scanning laser beam La reflected by the half-silvered mirror 34 is converged or focused onto the stimulable phosphor sheet Sh located on the light path from the mirror 34, and scans the stimulable phosphor sheet Sh in the main scanning direction (indicated by the arrow C).

The image reader 14 includes an elongate photomultiplier 38 as a photoelectric converter means, and a light guide 36 for guiding light emitted from the stimulable phosphor sheet Sh in response to application of the laser beam La toward a light detecting surface of the photomultiplier 38. The light detecting surface of the photomultiplier 38 extends in the main scanning direction. The light guide 36 has a light entrance surface disposed near the stimulable phosphor sheet Sh and extending in the main scanning direction. An analog output image signal produced by the photomultiplier 38 is converted by a logarithmic amplifier 40 into a signal indicative of a logarithmic function of the applied image signal. The analog logarithmic signal San from the logarithmic amplifier 40 is then applied to one input terminal of a subtractor 41. The subtractor 41 has its other input terminal, or subtrahend input terminal, supplied with the output monitor signal from the power monitor 26 as a corrective signal Sc via a signal correcting circuit 44. The subtractor 41 subtracts the corrective signal Sc from the analog logarithmic signal San to produce an image signal Sa which is then applied to an image input terminal of an A/D converter 45.

The synchronizing signal generating assembly 16 comprises a grid 46 composed of transmitting lines or slits 45a for passing the laser beam Lb from the half-silvered mirror 34 therethrough and reflecting lines or bars 45b for reflecting the laser beam Lb, the transmitting and reflecting lines 45a, 45b being alternately arranged in the direction in which the laser beam Lb is scanned, a cylindrical light guide 48 disposed behind and along the grid 46, a pair of photosensors 50a, 50b disposed on the opposite ends of the light guide 48 for detecting the laser beam Lb that has passed through the grid 46, and a synchronizing signal generator 42 for generating a synchronizing signal and a starting point signal representative of a read starting position on the stimulable phosphor sheet Sh based on grid signals from the photosensors 50a, 50b. The synchronizing signal generator 42 applies an output signal thereof to a synchronizing signal input terminal of the A/D converter 45.

The A/D converter 45 digitizes the corrected image signal Sa, using the synchronizing signal from the synchronizing signal generator 42 as a sampling clock signal, into a digital image signal which is fed to a signal processing circuit 58. The signal processing circuit 58 processes the digital image signal for gradation correction, profile emphasis, and the like, and then stores the processed digital image signal in an image memory 60. The image signal stored in the image memory 60 may then be fed via a D/A converter 62 and displayed as a visible image on a display unit 64 such as a CRT or the like.

The signal correcting circuit 44 is shown in detailed block form in FIG. 3. The signal correcting circuit 44 is basically constructed of a DC correcting unit 70, an AC correcting unit 72, and a correction arithmetic unit 74. The output monitor signal Pm from the power monitor 26 is applied to a DC correcting low pass filter 76 in the DC correcting unit 70 and also to an AC correcting high-pass filter 78 in the AC correcting unit 72. A DC variation or fluctuation signal Pd containing a low frequency signal having passed through the low-pass filter 76 is applied via an A/D converter 79 in the DC correcting unit 70 to a CPU 80 in the correction arithmetic unit 74. The CPU 80 calculates a corrective coefficient $\alpha/Pd$ based on the DC variation signal Pd and a reading condition $\alpha$, and applies a signal indicative of the corrective coefficient $\alpha/Pd$ to one input terminal of a multiplier 82 in the correction arithmetic unit 74. The other input terminal of the multiplier 82 is supplied with a high frequency variation or fluctuation signal $\Delta Pa$ from the high-pass filter 78. The signals $\alpha/Pd$, $\Delta Pa$ are multiplied by the multiplier 82 to produce a signal which is then applied to the subtrahend input terminal of the subtractor 41.

The image scanning reading apparatus including the signal correcting circuit, for carrying out an image signal correcting method of the present invention, is basically constructed as described above. Operation and advantages of the image scanning reading apparatus will hereinafter be described.

In FIG. 2, the stimulable phosphor sheet Sh on which image information of a subject is recorded upon exposure of the subject to X-rays or the like is fed in an auxiliary scanning direction (indicated by the arrow A) by a sheet feed mechanism (not shown). The laser beam La emitted from the laser beam source 20 is applied to the surface of the stimulable phosphor sheet Sh while being deflected in the main scanning direction (indicated by the arrow C). The image information recorded on the stimulable phosphor sheet Sh is thus produced as light PSL emitted from the stimulable phosphor sheet Sh. The emitted light PSL is then applied to the photomultiplier 38 via the light guide 36 extending in the main scanning direction over the stimulable phosphor sheet Sh. The photomultiplier 38 converts the received light to an electric signal S+ΔS and applies the electric signal to the logarithmic amplifier 40. S represents a signal component and ΔS a noise component. The analog logarithmic signal San produced from the logarithmic amplifier 40 with the signal component S and the noise component or variation ΔS being separated from each other, as indicated by the following equation (1):

$$San \approx \log S + k \cdot \frac{\Delta S}{S} \quad (1)$$

It is assumed here that the relationship represented by the equation (2), below, exists between the signal component S and the variation or noise component ΔS in the equation (1) (Normally, this assumption is true). Under this relationship, the coefficient k is a prescribed constant (e.g., if ΔS/S~0.01, then k~0.43).

$$1 >> \frac{\Delta S}{S} \quad (2)$$

A signal represented by laser beam L monitored by the power monitor 26 is applied as an output monitor signal Pm to the signal correcting circuit 44. In the signal correcting circuit 44, the signal Pm is passed through the low pass filter 76 which produces a DC variation or low frequency component Pd that is digitized by the A/D converter 79 and applied to the CPU 80. At the same time, the signal Pm is passed through the high pass filter 78 which produces a high frequency variation or high-frequency component ΔPa that is applied to one of the input terminals of the multiplier 82. The CPU 80 corrects the DC variation Pd with a corrective value represented by the reading condition α such as a pixel size or the like, and produces a corrective coefficient α/Pd at its output, which is applied to the other input terminal of the multiplier 82. Since the high-frequency variation ΔPa from the high-pass filter 78 is also applied to the multiplier 82, the multiplier 82 which has a multiplicator a produces an output corrective signal Sc as expressed by:

$$Sc = a \cdot \frac{\alpha \Delta Pa}{Pd} \quad (3)$$

The multiplicator a of the multiplier 82 is selected according to the following equation (4):

$$a = \frac{\Delta S}{S} \cdot \frac{Pd}{\alpha \Delta Pa} \cdot k \quad (4)$$

The detailed process of selecting the coefficient k will be described later. Here, an empirical value may be selected for the coefficient k. Since, $$\frac{\Delta S}{S} \cdot \frac{Pd}{\Delta Pa} = 1$$

it will be understood that the multiplicator a can uniquely be determined by inputting the reading condition α which is determined by the density of scanning lines or the like, according to the following equation (5):

$$a = \frac{1}{\alpha} \cdot k \quad (5)$$

The analog logarithmic signal San from the logarithmic amplifier 40 is expressed by the equation (1) referred to above. The image signal Sa from the subtractor 41 is therefore applied to the A/D converter 45 as a signal which is composed of only the signal component S free of the noise component or variation ΔS, as expressed by the following equation (6):

$$\begin{aligned} Sa &= San - Sc \quad (6) \\ &= \left[ \log S + k \cdot \frac{\Delta S}{S} \right] - \frac{k}{\alpha} \cdot \frac{\alpha \Delta Pa}{Pd} \\ &= \log S + k \cdot \frac{\Delta S}{S} - k \cdot \frac{\Delta S}{S} \\ &= \log S \end{aligned}$$

The laser beam Lb which has passed through the half-silvered mirror 34 is applied to the grid 46 of the synchronizing signal generating assembly 16. Then, the laser beam Lb scans the grid 46 from one end to the other in the direction of the arrow D upon swinging movement of the galvanometer mirror 28 in the direction of the arrow B.

The laser beam Lb that has passed through the transmitting lines 45a of the grid 46 enters the light guide 48, and repeats total reflection within the light guide 48 by being diffused in various different directions by a diffusion strip (not shown) disposed in the light guide 46 remote from the laser beam entrance side of the light guide 48. The laser beam Lb, after having repeated the total reflection in the light guide 48, finally reaches the photosensors 50a, 50b which photoelectrically convert the laser beam Lb to produce synchronizing grid signals. The synchronizing grid signals are then converted by the synchronizing signal generator 42 which comprises a frequency synthesizer or the like to a synchronizing signal comprising pixel clock pulses that are used as sampling pulses in the A/D converter 45. The digital image signal which is digitized by the A/D converter 45 is processed by the signal processing circuit 58 for gradation correction, profile emphasis, and the like, and then stored as image information in the image memory 60. The image information stored in the image memory 60 is sent, as desired, via the D/A converter 62 to the display unit 64 such as a CRT or the like for display. The coefficient k may easily be varied to select an optimum value therefor in order to make the image displayed on the display unit 64 most accurate. Alternatively, a reference stimulable phosphor sheet which has been exposed to a prescribed amount of radiation may be prepared, the coefficient k may be varied in each of given auxiliary scanning periods during the reading process for the reference stimulable phosphor sheet, and the value of the coefficient k which allows the most accurate image to be reproduced may be set as a default value in the multiplier 82.

In the above embodiment, the corrective signal calculated by the signal correcting circuit 44 is subtracted from the image signal which has been logarithmically converted by the logarithmic amplifier 40. However, the corrective signal may be subtracted from the image signal prior to logarithmic conversion thereof.

With the present invention, as described above, the amount of laser beam emitted from the laser beam source or laser oscillating tube is monitored by the power monitor, a laser noise correcting signal is generated from the monitor signal, and the laser noise correcting signal is subtracted from an image signal. Therefore, even if the laser beam from the laser oscillating tube contains laser noise, an image signal which is free from such laser noise can be produced.

The principles of the present invention are not limited to the illustrated embodiment, but are also applicable to image signal correction in the reading of a reflected image or a transmitted image.

Although a certain preferred embodiment has been shown and described, it should be understood that many changes and modifications may be made therein without departing from the scope of the appended claims.

What is claimed is:

1. A method of correcting an image signal, comprising the steps of:
    scanning an object on which image information is recorded, with a light beam;
    photoelectrically detecting light bearing the image information from the object to produce an image signal representing the image information;
    producing a monitor signal representing the light beam;
    dividing the monitor signal representing said light beam into a high-frequency component and a low-frequency component;
    producing a corrective signal by multiplying a ratio of said high-frequency component to said low-frequency component by a constant; and
    processing said image signal with said corrective signal.

2. A method according to claim 1, wherein said image signal is processed by substantially subtracting said corrective signal from said image signal.

3. An apparatus for correcting an image signal, comprising:
    a light beam source for emitting a light beam;
    scanner means for scanning an object on which image information is recorded, with said light beam;
    photoelectric converter means for photoelectrically detecting light bearing the image information from the object to produce an image signal representing the image information;
    means for reading the image information based on said image signal;
    monitor means for monitoring the intensity of the light beam emitted from said light beam source;
    signal correcting means for dividing an output signal from said monitor means into a high-frequency component and a low-frequency component and for producing a corrective signal by multiplying a ratio of said high-frequency component to said low-frequency component by a constant; and
    processing means for processing said image signal produced by said photoelectric converter means with said cotrective signal produced by said signal correcting means.

4. An apparatus according to claim 3, wherein said processing means comprises subtracting means for substantially subtracting said corrective signal from said image signal.

5. A method according to claim 1, wherein said object is a stimulable phosphor sheet.

6. An apparatus according to claim 3, wherein said object is a stimulable phosphor sheet.

* * * * *